United States Patent
Granite et al.

(10) Patent No.: US 7,033,419 B1
(45) Date of Patent: Apr. 25, 2006

(54) METHOD FOR HIGH TEMPERATURE MERCURY CAPTURE FROM GAS STREAMS

(75) Inventors: Evan J. Granite, Wexford, PA (US); Henry W. Pennline, Bethel Park, PA (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 127 days.

(21) Appl. No.: 10/663,052

(22) Filed: Sep. 16, 2003

(51) Int. Cl.
*B01D 53/04* (2006.01)
*B01D 53/64* (2006.01)

(52) U.S. Cl. .................. 95/134; 95/115; 95/133; 423/210; 502/339; 502/400

(58) Field of Classification Search .................. 95/115, 95/133, 134, 900–902; 423/210; 502/328, 502/339, 400
See application file for complete search history.

(56) References Cited

U.S. PATENT DOCUMENTS

| | | | | |
|---|---|---|---|---|
| 3,194,629 A | * | 7/1965 | Dreibelbis et al. | 423/210 |
| 3,786,619 A | * | 1/1974 | Melkersson et al. | 95/134 |
| 4,076,553 A | * | 2/1978 | Seidenberger | 134/6 |
| 4,101,631 A | * | 7/1978 | Ambrosini et al. | 423/210 |
| 4,206,183 A | * | 6/1980 | Yamada et al. | 423/210 |
| 4,474,896 A | * | 10/1984 | Chao | 502/216 |
| 4,500,327 A | * | 2/1985 | Nishino et al. | 95/134 |
| 5,063,194 A | * | 11/1991 | Broecker et al. | 502/314 |
| 5,080,799 A | * | 1/1992 | Yan | 210/661 |
| 5,186,727 A | * | 2/1993 | Chang | 95/117 |
| 5,209,773 A | * | 5/1993 | Audhe et al. | 75/388 |
| 5,419,884 A | * | 5/1995 | Weekman et al. | 423/210 |
| 5,543,379 A | * | 8/1996 | Gubitosa et al. | 502/184 |
| 5,559,065 A | * | 9/1996 | Lauth et al. | 502/5 |
| 5,695,726 A | * | 12/1997 | Lerner | 423/210 |
| 6,228,800 B1 | * | 5/2001 | Yamaguchi et al. | 502/339 |
| 6,258,334 B1 | * | 7/2001 | Gadkaree et al. | 423/210 |
| 6,521,021 B1 | * | 2/2003 | Pennline et al. | 95/134 |
| 6,576,092 B1 | * | 6/2003 | Granite et al. | 204/158.2 |
| 6,719,828 B1 | * | 4/2004 | Lovell et al. | 95/134 |
| 2001/0005499 A1 | * | 6/2001 | Ostgard | 423/477 |
| 2003/0095903 A1 | * | 5/2003 | Dettling et al. | 423/210 |
| 2003/0147793 A1 | * | 8/2003 | Breen et al. | 423/210 |
| 2003/0170159 A1 | * | 9/2003 | Honjo et al. | 423/210 |
| 2004/0087441 A1 | * | 5/2004 | Bock et al. | 502/313 |
| 2005/0065026 A1 | * | 3/2005 | Okubo | 502/339 |

* cited by examiner

*Primary Examiner*—Robert H. Spitzer
(74) *Attorney, Agent, or Firm*—Mark LaMarre; Mark Dvorscak; Paul A. Gottlieb

(57) ABSTRACT

A process to facilitate mercury extraction from high temperature flue/fuel gas via the use of metal sorbents which capture mercury at ambient and high temperatures. The spent sorbents can be regenerated after exposure to mercury. The metal sorbents can be used as pure metals (or combinations of metals) or dispersed on an inert support to increase surface area per gram of metal sorbent. Iridium and ruthenium are effective for mercury removal from flue and smelter gases. Palladium and platinum are effective for mercury removal from fuel gas (syngas). An iridium-platinum alloy is suitable for metal capture in many industrial effluent gas streams including highly corrosive gas streams.

18 Claims, 3 Drawing Sheets

METHOD FOR HIGH TEMPERATURE MERCURY CAPTURE FROM GAS STREAMS

CONTRACTUAL ORIGIN OF THE INVENTION

The United States Government has rights in this invention pursuant to the employer-employee relationship between the Government and the inventors.

BACKGROUND OF THE INVENTION

1. Field of the Invention

The invention relates to a method for the use of sorbents for the treatment of effluent gases, and more specifically, this invention relates to a method for the utilization of metal sorbents for the removal of mercury (Hg) from high temperature gases generated from sources such as coal gasifiers, coal-fired electrical generating plants, and ore smelters.

2. Background of the Invention

Gasification is an important strategy for increasing the utilization of abundant domestic coal resources. Rather than burning coal directly, coal gasification reacts coal with steam and carefully controlled amounts of air or oxygen under high temperatures and pressures to break apart the chemical bonds in coal to form a gaseous mixture, typically comprising hydrogen and carbon monoxide. The Department of Energy (DOE) envisions increased use of gasification in the United States during the next twenty years. As such, the DOE will strive for a goal of near-zero emissions of pollutants.

There are increasing concerns that air emissions from coal utilization, including gasification processes, will add mercury to the environment. The United States Environmental Protection Agency (EPA) intends to regulate coal-utilizing (gasifiers and combustors) facilities for mercury emissions. The Clear Skies Initiative, proposed in February 2002, would dramatically limit the emissions of mercury from all coal-utilizing facilities, including electrical generating plants.

There has been little progress in removing of mercury from high temperature gas streams. As such, nearly all of the mercury in the coal ends up in the flue gases (~1 part per billion (ppb) concentration) and fuel gases (~3 ppb concentration). Many sorbents' capacities for the adsorption of mercury is limited as shown in Table 1 infra.

Adsorption of mercury on a sorbent generally decreases as temperature increases. This is primarily true when the mechanism of removal is physical adsorption. Recent studies have suggested that carbon-based sorbents are unsuited for mercury capture from gas at temperatures higher than about 205° C. (400° F.). This is shown in: G. P. Reed, A. Ergudenler, J. R. Grace, A. P. Watkinson, A. A. Herod, D. Dugwell, and R. Kandiyoti, *Fuel*, 79, 1077–1087 (2000); 80, 623–634 (2001). Also, carbon lacks regeneration capabilities and chemical resistance.

Iridium (Ir) has been used as a trap for an ultraviolet detector for trace mercury determinations in water. This is shown in: H. W. Sinemus and H. H. Stabel, *Spectrochimica Acta*, 48B (14) 1719–1722 (1993). The iridium trap was regenerated in a two-step heating process. Heating at 925° C. (1700° F.) desorbed the mercury and heating at 1980° C. (3600° F.) removed any adsorbed arsenic (As) or selenium (Se) to restore the iridium trap to full efficiency.

TABLE 1

Sorbent Capacities in Nitrogen[a,b]

| Sorbent | Capacity (mg Hg/g sorbent) | Temperature (° F.) |
| --- | --- | --- |
| $MoS_2$ | 0.50 | 400 |
| PbSe | 0.00 | 400 |
| $MnO_2$—$Al_2O_3$ | 0.14 | 400 |
| $Cr_2O_3$—$Al_2O_3$ | 0.99 | 400 |
| NiO—$Al_2O_3$ | 0.03 | 400 |
| CuO—$Al_2O_3$ | 0.05 | 400 |
| $Co_2O_3$—$Al_2O_3$ | 2.00 | 400 |
| $SiO_2$ | 0.00 | 400 |

[a]mg = milligrams; g = grams.
[b]The absorption conditions comprised a gas composition of 270 parts per billion (ppb) mercury in $N_2$; a flow-rate of 60 ml/min; a packed-bed reactor with an outer diameter of ¼ inch and an inner diameter of ⅛ inch. (The 270 ppb mercury concentration is similar to that found in incinerator effluent gases.)
Ten mg of sorbent were used for each run. The length of sorbent exposure to the mercury/nitrogen gas mixture was 350 minutes (mins). The maximum effective capacity giving 100% Hg capture is 5.5 mg Hg/g sorbent.

Thermal desorption of surface-bound mercury from iridium foil has been shown to occur at between 165° C. (329° F.) and 190° C. (374° F.). Slower desorption of mercury from an iridium lattice in solid solution has been shown at temperatures between 190° C. (375° F.) and 500° C. (932° F.). This is demonstrated in: F. L. Fertonani, E. Milare, A. V. Benedetti, and M. Ionashiro, *Journal of Thermal Analysis and Calorimetry*, 67, 403–409 (2002).

U.S. Pat. No. 6,576,092 awarded to Granite, et al., on Jun. 10, 2003 discloses a method for the removal of mercury, the method comprising irradiating the mercury with UV light.

U.S. Pat. No. 6,521,021 awarded to Pennline, et al., on Feb. 18, 2003 discloses a system and method for the removal of mercury from the flue gas of a coal-fired power plant. A thermally activated sorbent is produced in situ at the power plant.

None of the aforementioned patents provides a high-capacity sorbent for mercury removal at temperatures greater than 205° C. (400° F.).

None of the aforementioned prior art provides a means for adsorbing mercury at temperatures greater than 205° C. (400° F.).

A need exists for a process to capture mercury from either flue gas or fuel gas (syngas) at high temperatures (i.e., greater than 200° C.). The process should incorporate a means for removing the target metal at ambient and above-ambient temperatures. The means should be comprised of readily-available materials. Further, the process should not require specialized training or equipment.

SUMMARY OF INVENTION

An object of the present invention is to produce a metal-capturing active metal-based sorbent that overcomes all of the disadvantages of the prior art. Another object of the present invention is to provide a process for adsorbing metal from fluids at a myriad of temperatures. A feature of the invention is the utilization of active metal sorbents which relegate metal adsorption to the sorbents' exterior surface at a first lower temperature, but which allows for adsorption of metals into interior regions of the sorbent at a second higher temperature. An advantage is that the metal sorbent can be utilized to capture metals during various cycles of an effluent discharge.

Still another object of the present invention is to provide a process for removing mercury from gas streams with metal sorbents. A feature of the invention is that the metal that is removed is a Group IIB (12 (IUPAC convention)) element. Another feature is that the gas contacts solid mass configurations throughout which the metal sorbent is dispersed. An advantage of the invention is that the solid mass configuration allows homogeneous fluid communication between the metal and the active metal sorbent to enable efficient capture of the metal.

Yet another object of the present invention is to provide a method in which active metal sorbents adsorb volatile metal over a range of elevated temperatures. A feature of the invention is that the sorbents provided by this method adsorb metal from 175° C.–370° C. (350° F.–700° F.) via an amalgamation or reaction process. An advantage of the invention is that by removing the metal at temperatures within the above stated range, the process maintains the thermal efficiency of the gasifier system.

Still another object of the present invention is to provide a method that allows a metal sorbent to adsorb metal on its surface. A feature of the invention is that homogeneous diffusion of the target metal throughout the sorbent, which has a surface area between 1 $m^2$/gram and 1000 $m^2$/gram, increases with increasing temperatures. An advantage is that the method captures the metal at higher temperatures, thus maintaining thermal efficiency.

Yet another object of the present invention is to provide a method for regenerating a metal sorbent. A feature of the invention is that regeneration of the sorbent can be accomplished by heating above 925° C. (1700° F.). Regeneration can also be accomplished by contact with an acid. An advantage of the invention is that the regeneration process is one step and inexpensive.

Still another object of the present invention is to provide a method for increasing the surface area of metal sorbents. A feature of the invention is deposition of a thin layer of active metal on a high temperature tolerant support material. An advantage is that the method reduces the amount of metal used in the production of sorbent and thus lowers the costs of using expensive metals.

Yet another object of the present invention is to provide a method for increasing the resistance of metal sorbents to corrosion by alloying them. A feature of the invention is an iridium-platinum alloy sorbent which resists corrosion in the presence of the harshest gas stream components. An advantage is that the sorbent alloy is suitable for metal capture in many industrial effluent gas streams.

Briefly, the invention provides a process for removing metal from fluids, the process comprising supplying an active metal sorbent; and contacting the fluid with the sorbent for a time sufficient for the metal to absorb to predetermined regions of the sorbent. The invention also provides a process for increasing the surface area of metal sorbents, the process comprising depositing active metal on a support. Further, the invention provides a process of increasing the resistance of metal sorbents to chemical reaction, the process comprising alloying active metals.

BRIEF DESCRIPTION OF DRAWINGS

The invention together with the above and other objects and advantages will be best understood from the following detailed description of the preferred embodiment of the invention shown in the accompanying drawings, wherein.

DETAILED DESCRIPTION OF THE INVENTION

Figure 1:
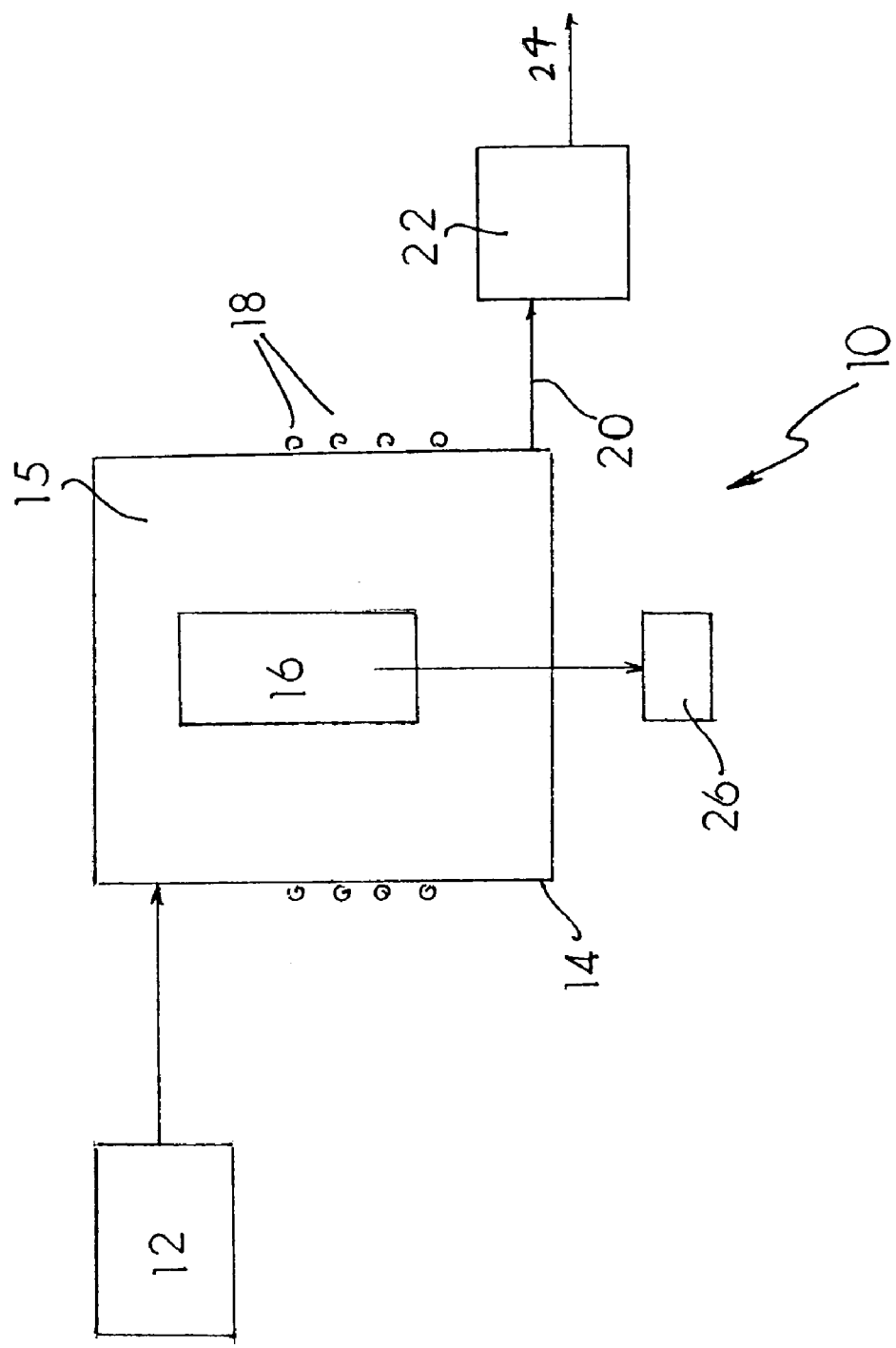
FIG. 1 depicts the adsorption-desorption process for metals onto metal sorbents, in accordance with features of the present invention.

The inventors have developed a process to facilitate mercury extraction from fluids such as high temperature flue/fuel gas. Specifically, the inventors have developed metal sorbents which adsorb mercury on their exterior and interior surfaces at ambient and high temperatures, respectively. The adsorption process is reversible at other conditions such as high temperatures.

The metal sorbent consists of a metal selected from the group consisting of Iridium (Ir), palladium (Pd), platinum (Pt), and ruthenium (Ru) or a combination thereof. Iridium and ruthenium are preferable sorbent constitutents for flue and smelter gas cleanup whereas palladium and platinum are preferable constituents for syngas treatment. An iridium-platinum alloy appears effective for both flue/smelter gases and syngases. All four metals and their alloys are considered "active" metals with regard to the adsorption/absorption of mercury and other metals.

The benefits of high temperature (205° C.–370° C. (400° F.–700° F.)) mercury removal include the ability to utilize warm gas cleanup methods which already exist for scrubbing hydrogen sulfide ($H_2S$) from the effluent gases. This supercedes typical methods which require cooling the effluent gases in order to scrub hydrogen sulfide. Thus, thermal energy efficiency is enhanced. Also enhanced is the capability of removing a vast majority of the coal-inlet mercury at one location, compared to the present systems where not all of the mercury is accounted for.

The invented process provides for the removal of metal from fluids by supplying an active metal sorbent, in the form of a solid mass, and contacting the gas with the sorbent. The invented process can be used in a variety of substrate geometries and reactor designs. In addition, the invented process provides a method by which the surface area of the metal in communication with the gas is increased by depositing active metal on a support, thus increasing the capacity of the sorbent. Some clean up instances mandate that the active metal is dispersed homogeneously throughout the support.

The inventors surmise that mercury diffuses further into the metal lattice as temperature increases, thus suggesting increasing capacity for mercury with increasing temperature in the range of 150° C.–290° C. (300° F.–550° F.). The process is reversible in that adsorbed mercury can be desorbed for subsequent collection and proper disposal or use.

The invented process can be utilized on gas streams that require mercury/metal emissions control. Often, the gases to be treated will contain volatile metals, which this process is adroit at removing. Exemplary fluid sources include gases within gasification processes, such as integrated gasification combined cycle (IGCC) or combustion gases selected from the group consisting of IGCC effluents, municipal solid waste incinerators, hazardous waste incinerators, medical waste incinerators, municipal sludge incinerators, crematories, coal-fired power plants, gasifiers, or combinations thereof. Generally, gas streams with temperatures greater than approximately 150° C. (300° F.) are suitable. Also, gas streams mixed with air, nitrogen, and other ambient fluids are suitable. The active metal sorbents can also be used for gas streams to adsorb mercury and other metals at lower temperatures such as ambient temperatures (e.g., 20° C. to 25° C.).

The four active metals, Ir, Pd, Pt, and Ru, can be alloyed with each other to increase the resistance of metal sorbents to certain deleterious chemical reactions.

The invented iridium-platinum alloy sorbent resists corrosion in the presence of the harshest gas stream components coming from the group consisting of, but not limited to, chlorine ($Cl_2$), hydrogen chloride (HCl), nitrogen oxides ($NO_x$), sulfur dioxide ($SO_2$), sulfur trioxide ($SO_3$), hydrogen sulfide ($H_2S$), and ammonia ($NH_3$). This iridium-platinum alloy is suitable for metal capture in many industrial effluent gas streams.

The process is capable of operating at temperatures ranging between 120° C.–370° C. (250° F.–700° F.).

The reactive pollutants in the gas streams are Group IIB (12) metals such as mercury and cadmium (Cd). Other possible pollutants include Group VA (15) and Group VIA (16) elements such as arsenic and selenium, respectively.

The adsorption/desorption process is depicted as numeral 10 in FIG. 1. A gas stream 12, which contains a target metal such as mercury, is provided. The gas stream 12 is subsequently contacted with a target metal sorbent 16 residing in a controlled atmosphere. The atmosphere is typically defined by an enclosure 14 or some type of housing adopted to control pressure and temperature of the interior of the housing. As such, the interior serves as the reaction zone 15 for the process.

Optimally, the enclosure also may feature means for heating 18 the reaction zone, exemplary means comprising externally mounted heating coils or heat transfer surfaces.

After contact with the metal sorbent 16, treated gas 20 can be subsequently treated 22 for any remaining regulated pollutants. Ultimately, the treated gas stream is released through typical channels 24.

The process also provides for regeneration of the sorbent 16 upon heating at temperatures above adsorbing-instigating temperatures. Any desorbed mercury 26 is then processed for use or proper disposal.

Iridium, palladium, platinum, and ruthenium metals possess mechanical properties that make these metals preferred sorbents for metal capture in high temperature (between about 150° C.–370° C. (300° F.–700° F.)) gas. These are platinum group metals and have melting points of 2447° C., 1554° C., 1772° C., and 2310° C. respectively. Iridium is corrosion-resistant and a hard metal with an elastic modulus of 570 Gigapascals (GPa). Palladium, platinum, and ruthenium are highly corrosion-resistant with elastic moduli of 121 Gpa, 168 GPa, and 220 Gpa, respectively. All four metals have a hexagonal or cubic close-packed lattice structure. Mercury will only adsorb on the surface of these metals at ambient temperatures, possibly due to the hardness of the metals.

Figure 2:
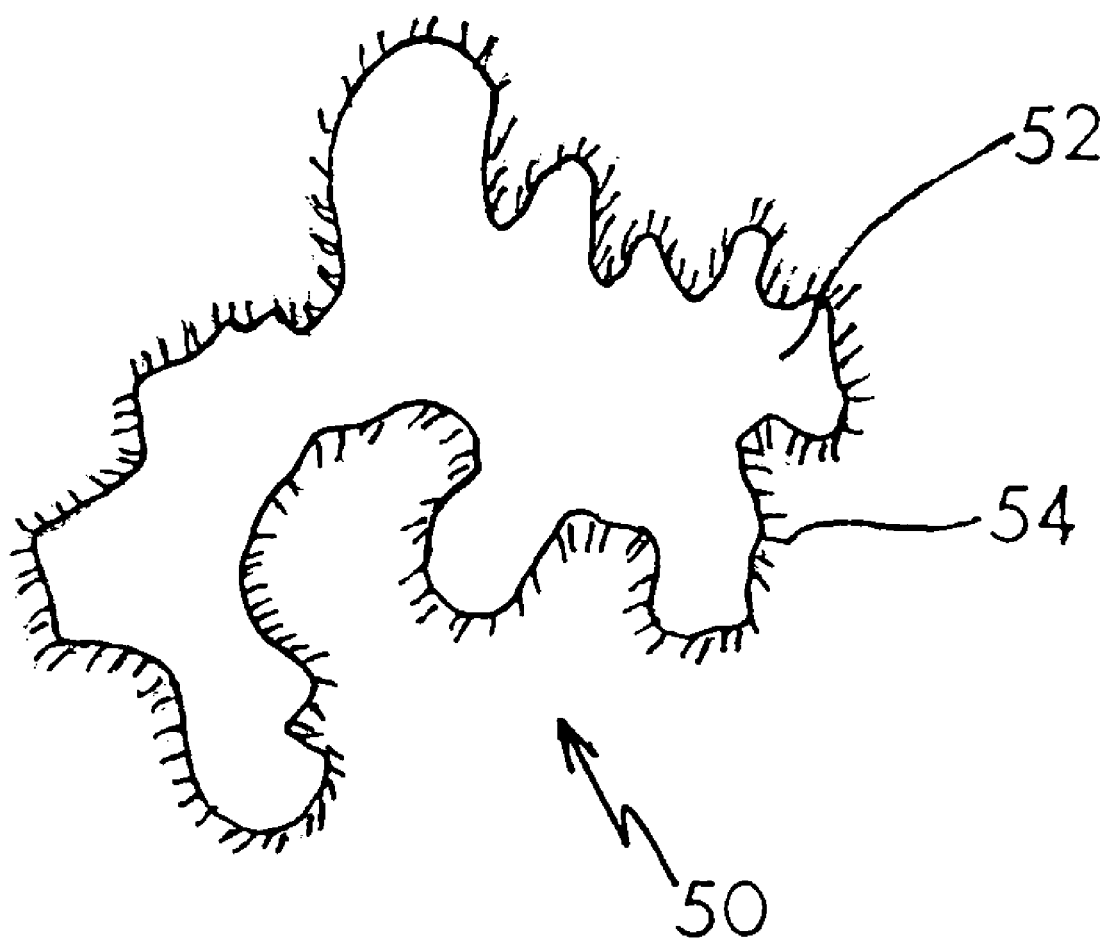
FIG. 2 depicts a metal sorbent on a substrate's surface, in accordance with features of the present invention.

The invented process and sorbent provides a two-step mechanism to capture mercury. The mechanism employs both surface adsorption, as well as the formation of a solid solution (an amalgam, i.e., an alloy of mercury with another metal, formed by mercury penetrating the metal lattice). A metal sorbent on a substrate's surface is depicted in FIG. 2 as numeral 50. The substrate 52 has finely divided metal 54 adsorbed to the substrate's surface. This metal film facilitates both adsorption and amalgam mechanisms.

At temperatures of between 120° C. (250° F.) and 150° C. (300° F.), the target metal (e.g. mercury) is relegated to the exterior surface or region of the active metal. Thus, the surface adsorption would be the predominant mechanism at lower temperatures (below 150° C. (300° F.)).

Diffusion of mercury into the metal lattices (i.e., the inner regions of the metal) increases with temperatures above those used for the initial surface adsorption step (i.e., above 150° C. (300° F.). These higher temperatures "open" the lattices of the active, hard, high-melting noble metals comprising the metal film so as to make their interiors accessible for increased target-metal capture.

Figure 3:
FIG. 3 depicts the expansion and opening of a metal substrate's surface upon heating, in accordance with features of the present invention.

The expansion and opening of a metal substrate's surface upon heating is shown as numeral 60 in FIG. 3. The inner regions 62 of the active metal 54 are depicted. This diffusivity of mercury into the sorbent lattice structure causes formation of the solid solution noted supra. Thus, mercury adsorbed upon the metals' surfaces at a first temperature can further penetrate into the metals' lattices at relatively higher second temperature.

Because the concentration of metal in the fuel gas is so small and the amount emitted from a power generation facility is small over the course of a year, several reactor configurations are available to utilize the iridium sorbent for metal capture. Such configurations are selected from a group consisting of packed bed, fluidized bed, and moving bed.

The active metal itself can be directly used as a sorbent or supported on a substrate which can be pellets of some geometry or monolith. The active metal and substrate can also be formed into a sorbent by thorough and homogenous mixing with subsequent extrusion.

An IGCC plant on the scale of 500 Megawatts (MW) makes only 200 to 300 pounds of mercury per year. Any metal sorbent bed used for this would have to be regenerated only once or twice per year. Heating of the sorbent bed to required decomposition temperatures for amalgams will be infrequent.

EXAMPLES

Tests were carried out on the metal sorbents in a small-scale laboratory reactor at the NETL in Pittsburgh, Pa. Active metal sorbents such as iridium had a surface area of about 20 $m^2$/gram in the form of pure iridium. Ten milligrams of iridium sorbent were placed in a reactor. The reactor comprised a ¼ inch outer diameter quartz tube with glass wool supporting the sorbent in a vertical packed-bed configuration.

The sorbent was exposed to a gas stream comprising 270 ppb elemental mercury (Hg) in nitrogen ($N_2$) carrier gas with flow rate of 60 milliliters per minute (ml/min). This gas composition is to simulate a flue gas. In the alternative, a gas stream was used having the same concentration of mercury, the same flow rate and a composition of 36 mole (mol) % carbon monoxide (CO), 27 mol % hydrogen ($H_2$), the mercury, and the balance nitrogen. This composition is for a simulated fuel gas or syngas. (The 270 ppb mercury concentration is typical of incinerator effluent gases.)

The removal of Hg from the gas stream was measured. For some test runs, the spent sorbent was analyzed using a CETAC M-6000A cold vapor atomic absorption spectrophotmeter (CVAA), (CETAC Technologies, Omaha, Nebr.).

Table 2 infra summarizes the effect of temperature on iridium's mercury absorption capacity.

TABLE 2

Mercury absorption capacity of iridium as a function of temperature[a].

| Sorbent | Capacity (mg/g) | Temp (° F.) |
|---|---|---|
| Ir | 2.11 | 400 |
| Ir | 2.69 | 450 |
| Ir | 2.90 | 500 |

[a]Conditions were:
1) Ten mg Ir black (pure) (Aldrich Chemical Company, Milwaukee, WI); surface area of 20 $m^2/g$.
2) Hg concentration 270 ppb in $N_2$ carrier gas.
3) Hg measurement by cold vapor atomic absorption spectrophotometer (CVAAS) of absorbent at test end.

Table 3 infra gives results for the percent of mercury capture by iridium. Mercury capture is defined as the mass of mercury contained in the sorbent after use divided by the mass of mercury that passes through the bed, typically in 350 minutes (mins).

TABLE 3

Mercury capture by iridium as a function of temperature and exposure time[a]

| Temperature (° C. (° F.)) | Time Exposed (min) | % Mercury Captured by Iridium Sorbent |
|---|---|---|
| 246 (475) | 425 | 96 |
| 287 (550) | 350 | 93 |
| 329 (625) | 350 | 60 |
| 371 (700) | 350 | 40 |

[a]Conditions were
1) Ten mg Ir sorbent in packed-bed.
2) 270 ppb Hg in $N_2$ with a flow rate of 60 ml/min.
3) Adsorbed Hg measured by an on-line BrooksRand CVAFS-2 atomic fluorescence spectrometer (AFS), (BrooksRand, Seattle, WA).
4) Maximum capacity (100% Hg capture) determined to be 5.5 mg Hg/gram sorbent for an exposure time of 350 minutes (mins).

As can be seen from Table 3, lower temperatures and longer exposure times over the sorbent allow for a greater percent capture of the mercury in the effluent stream. Nevertheless, a high percentage of mercury capture can be seen even at 370° C. (700° F.). Higher temperatures are used for sorbent regeneration.

Similar tests on palladium, platinum, and ruthenium as sorbents of Group IIB (12) elements were carried out. Each sorbent metal was tested using separately two different gases: 1) 270 ppb mercury in otherwise pure nitrogen gas, and 2) a simulated fuel gas or syngas with a composition of: 36% (mol) carbon monoxide (CO), 27% hydrogen ($H_2$), 270 ppb mercury (Hg), and the remainder nitrogen gas. Ten mg of each metal sorbent were placed in a vertical packed-bed reactor supra, and exposed to the mercury in either the nitrogen gas or the simulated syngas for 350 minutes. The results for these tests are given in Table 4 infra.

TABLE 4

Mercury capture (%) by palladium, platinum, and ruthenium as a function of temperature[a].

| Metal | 205° C. (400° F.) | 290° C. (550° F.) | 370° C. (700° F.) |
|---|---|---|---|
| Pd | 58 | 100 | 35 |
| Pt | — | 65 | — |
| Ru | 60 | 65 | 36 |

[a]Conditions were:
1) For each trial, the sorbent was 10 mg of pure metal in a vertical packed-bed configuration. The palladium (Alfa Aesar, Ward Hill, MA) was 99.95% pure, particle size of 1 micron (µ), and had a surface area of 1 $m^2/g$. The platinum (Alfa Aesar, Ward Hill, MA) was platinum black (pure) with a surface area of 27 $m^2/g$. The ruthenium (Engelhard, East Newark, NJ) and was 5% Ru on char (carbon support).
2) Hg concentration 270 ppb in $N_2$ carrier gas. Flow rate was 60 ml/min.
3) Hg measurement by cold vapor atomic absorption spectrophotometer (CVAAS) or by AFS as mentioned supra.
4) Maximum capacity (100% Hg capture) determined to be 5.5 mg Hg/gram sorbent for an exposure time of 350 minutes (mins).

Clearly, these three active metals display a considerable capacity for mercury adsorption up to at least 290° C.(550° F.). In addition, tests were carried out on all four active metals using a simulated fuel gas having the composition: 36 mol % CO, 27 mol % $H_2$, 270 ppb Hg, and the balance $N_2$. The simulated fuel gas flow rate was 60 ml/min. Pure active metal was used as the sorbent in the amount of 10 mg in a packed-bed configuration. The results are given in Table 5 infra. The data in Table 5 demonstrates that palladium and platinum are good absorbers of mercury found in fuel gases with platinum having a 100% capture capability.

TABLE 5

Mercury capture (%) from simulated fuel gas by iridium, palladium, platinum, and ruthenium as a function of temperature[a].

| Metal | 290° C. (550° F.) |
|---|---|
| Pt | 100 |
| Pd | 76 |
| Ir | 3 |
| Ru | 1 |

[a]Conditions were:
1) For each trial, the sorbent was 10 mg of metal sorbent in a vertical packed-bed configuration. The specifications of the iridium are described in Table 2 supra and for the three other metals in Table 4 supra.
2) Gas was 36 mol % CO, 27 mol % $H_2$, 270 ppb Hg, balance $N_2$. Flow rate was 60 ml/min.
3) Hg measurement by cold vapor atomic absorption spectrophotometer (CVAAS).
4) Maximum capacity (100% Hg capture) determined to be 5.5 mg Hg/gram sorbent for an exposure time of 350 minutes (mins).

The used sorbents were digested in aqua regia (a mixture of one volume of concentrated nitric acid with three to four volumes of concentrated hydrochloric acid) to determine the mercury capture by cold vapor atomic absorption (CVAA).

The capacities displayed by all tested metal sorbents demonstrate that the metal sorbents can readily absorb the mercury levels found in incinerator gases (~100 ppb to ~600 ppb). Incinerator gases' mercury levels far exceed the mercury levels found in power-plant flue gases (~1 ppb) and fuel gases (~3 ppb).

Sorbent Formation Detail

Sorbents are formed to increase the surface area of pure metal sorbent by depositing the metal sorbent on a high temperature tolerant support material.

The support is a material selected from the group consisting of activated carbon, alumina, aluminosilicates, silica, titania, zirconia, zeolite, or combinations thereof.

These support materials can withstand temperatures above 925° C. (1700° F.). The ruthenium mentioned in note 1 of Table 4 supra was 5% Ru on char, a form of carbon.

The metal sorbent can be evenly deposited upon a support material from methods which include, but are not limited to, application of paints, inks and pastes containing the metal sorbent; chemical vapor deposition (CVD); electrodeposition; extrusion; incipient wetness; and solution wash. Incipient wetness is similar to a wash method. Solution wash comprises placing the metal sorbent into a solution, soaking the support in the solution for a period of time with subsequent calcination or heating.

Deposition of active metal on the support materials described supra can be carried out in a controlled atmosphere selected from the group consisting of argon (Ar), nitrogen ($N_2$), or a combination thereof.

The sorbent can be formed into a solid phase selected from the group of extrudates, powders, pellets, or monoliths to accommodate various reactor configurations.

Generally, the resultant surface area of the sorbent solid is between approximately 1 $m^2$/gram and 1000 $m^2$/gram. Higher surface areas (>30 $m^2$/gram) are preferable in order to maximize the number of collisions between the metal sorbent surface and the metal to be absorbed.

Sorbent Regeneration Detail

Sorbents can be regenerated easily by application of either heat or acid. The one-step regeneration is both simple and inexpensive, thus allowing for cost savings that offset the use of expensive metals over the life of the sorbents.

Sorbent regeneration can be carried out in an inert atmosphere such as heating under vacuum, or under a nitrogen or argon atmosphere. Sorbents can be heated to above 500° C. (930° F.) for a period of time. The mercury desorbs from the sorbent as elemental mercury. The mercury is then removed from the system by condensation and gravity collection for subsequent use or disposal.

Other Group IIB (12) elements can desorb in a similar manner.

Mercury and other Group IIB (12) elements can also be removed by an acid wash using either nitric acid, hydrochloric acid, or both in combination as aqua regia. The reactions for these two acids are given in part by equations 1 through 3. Due to the complex nature of the reaction of mercury with these acids other reactions may be taking place.

$$Hg(s/l) + 4\ HNO_3\ (aq/concentrated) \rightarrow Hg(NO_3)_2\ (aq) + 2\ NO_2\ (g) + 2H_2O\ (l) \quad \text{Equation 1}$$

$$2\ Hg(s/l) + 4\ HNO_3\ (aq/dilute) \rightarrow Hg_2(NO_3)_2\ (aq) + 2\ NO\ (g) + 2H_2O\ (l) \quad \text{Equation 2}$$

$$Hg(s/l) + 2\ HCl\ (aq/concentrated) \rightarrow HgCl_2\ (aq) + H_2\ (g) \quad \text{Equation 3}$$

Equations 1 and 3 represent the reactions of mercury with concentrated hydrochloric acid and concentrated nitric acid, the two components of aqua regia. The two concentrated acids and aqua regia oxidize mercury metal to the mercury (II) ion whereas the dilute nitric acid shown in Equation 2 oxidizes mercury to the mercury (I) ion. The mercury can be recovered from the acid solutions by subsequent reduction of the mercury (I) and mercury (II) ions.

The capacities displayed by all tested metal sorbents demonstrates that the metal sorbents can readily absorb the mercury levels found in incinerator gases (~100 ppb to ~600 ppb). Incinerator gases' mercury levels far exceed the mercury levels found in power-plant flue gases (~1 ppb) and fuel gases (~3 ppb).

Palladium and platinum have a greater capacity for absorbing mercury contained in fuel gas or syngas.

Iridium and ruthenium display a similar greater absorption capacity for the mercury found in flue gases resulting from combustion of coals, wastes such as are combusted in incinerators.

The four active metals, Ir, Pd, Pt, and Ru, can be alloyed with each other to increase the resistance of metal sorbents to certain deleterious chemical reactions.

The iridium-platinum alloy sorbent is suitable for metal capture in many highly corrosive industrial effluent gas streams.

These precious metals' mechanical properties allow for their use in many substrate geometries or various reactor designs. All four metals are highly resistant to chemical reaction with gas compounds.

The solid mass configuration allows for homogeneous fluid communication between the metal and the iridium to enable efficient capture.

Removing metal from gas at temperatures between the range of approximately 120° C.–370° C. (250° F.–700° F.) maintains the thermal efficiency of the gasifier system.

The sorbent can capture an increasing amount of metal from gas as temperature increases, thus increasing capacity of the sorbent when exposed to gas.

The one-step regeneration process enables the sorbent to be used for additional adsorption/desorption cycles, thus allowing for additional cost savings.

The invented process reduces the amount of precious metal used in the production of sorbent and thus lowers the costs of using these metals.

While the invention has been described with reference to details of the illustrated embodiment, these details are not intended to limit the scope of the invention as defined in the appended claims.

We claim:

1. A process for removing metal from fluid, the process comprising:
   a) supplying an active metal sorbent; and
   b) contacting the fluid with the sorbent for a time sufficient for the metal to absorb to predetermined regions of the sorbent, wherein the active metal sorbent is selected from the group consisting of iridium, palladium, ruthenium and iridium-platinum alloy and the fluid is selected from the group consisting of flue gases and combustion gases.

2. The process as recited in claim 1 wherein the contacting step further comprises:
   a) relegating metal adsorption to an exterior surface of the sorbent; and
   b) allowing the relegated metal to diffuse into the interior of the sorbent.

3. The process as recited in claim 2 wherein the metal diffuses into the sorbent when the sorbent is heated to more than 150° C. (300° F.).

4. The process as recited in claim 1 wherein the metal to be adsorbed is a Group IIB metal selected from the group comprising of mercury, cadmium or a combination thereof.

5. The process as recited in claim 4 wherein the Group IIB metal forms an amalgam with the metal in the sorbent.

6. The process as recited in claim 4 wherein the Group IIB metal is desorbed from the sorbent.

7. The process as recited in claim 1 wherein the temperature of the fluid ranges from approximately 170° C. to 370° C. (700° F.).

8. The process as recited in claim 1 wherein the metal sorbent is a solid mass.

9. The process as recited in claim 8 wherein the active metal is dispersed throughout the solid mass.

10. The process as recited in claim 9 wherein the surface area of the solid mass is between approximately 1 $m^2$/gram to 1000 $m^2$/gram.

11. The process as recited in claim 1 wherein the metal sorbent is regenerated by heating to a temperature above 500° C. (930° F.).

12. A process for increasing the surface area of an active metal sorbent, the process comprising:
   a) supplying a support with a surface area of between 1 $m^2$/g to 1000 $m^2$/g; and
   b) depositing active metal sorbent on the support, wherein the active metal sorbent is selected from the group consisting of iridium, palladium, ruthenium and iridium-platinum alloy and the active metal is deposited on a support in a controlled atmosphere selected from the group consisting of argon (Ar), nitrogen ($N_2$), or a combination thereof.

13. The process as recited in claim 12 wherein the support is a high temperature tolerant material selected from a group consisting of activated carbon, alumina, aluminosilicates, silica, titania, zirconia, zeolite, or combinations thereof.

14. The process as recited in claim 12 wherein the support can withstand temperatures above 925° C. (1700° F.).

15. The process as recited in claim 12 wherein the deposited metal sorbent is a solid phase selected from the group consisting of extrudates, powders, pellets, or monoliths.

16. The process of claim 14 further comprising increasing the resistance of metal sorbents to chemical reaction, the process comprising alloying active metals, wherein the active metal sorbent is selected from the group consisting of iridium, palladium, ruthenium and iridium-platinum alloy.

17. A process for increasing the surface area of an active metal sorbent, the process comprising:
   a) supplying a support with a surface area of between 1 $m^2$/g to 1000 $m^2$/g; and
   b) depositing active metal sorbent on the support, wherein the active metal sorbent is selected from the group consisting of iridium and ruthenium.

18. The process as recited in claim 17 wherein the active metal is deposited on a support in a controlled atmosphere selected from the group consisting of argon (Ar), nitrogen ($N_2$), or a combination thereof.

* * * * *